United States Patent [19]

Shibauchi et al.

[11] Patent Number: 5,157,895
[45] Date of Patent: Oct. 27, 1992

[54] POSITIONING AND PRESS-SEALING MEANS

[75] Inventors: Yoshito Shibauchi; Kohichi Hatanaka; Tatsuo Tanaka, all of Saitama; Katsuyuki Mogi; Tadashi Hanada, both of Kanagawa; Mamoru Fujita, Tokyo, all of Japan

[73] Assignees: Snow Brand Milk Products, Ltd., Sapparo; Yoshino Kogyosho Co., Ltd., Tokyo, both of Japan

[21] Appl. No.: 633,221

[22] Filed: Dec. 21, 1990

Related U.S. Application Data

[62] Division of Ser. No. 337,133, Apr. 12, 1989.

[30] Foreign Application Priority Data

Apr. 21, 1988 [JP] Japan .................. 63-099124
Apr. 25, 1988 [JP] Japan .................. 63-101995

[51] Int. Cl.$^5$ ............................. B65B 7/28
[52] U.S. Cl. ................................. 53/201; 53/300; 53/329.3; 53/367; 53/374.8; 156/69; 156/583.1
[58] Field of Search .......... 53/201, 282, 300, 329, 53/367, 368, 284.5, 329.2, 329.3, 373.7, 374.8, 375.3; 156/69, 583.1, 583.3

[56] References Cited

U.S. PATENT DOCUMENTS

| | | | |
|---|---|---|---|
| 1,469,874 | 10/1923 | Beardsley et al. ........... | 53/368 X |
| 3,112,587 | 12/1963 | Anderson et al. ........... | 53/329 X |
| 3,505,781 | 4/1970 | Loewenthal . | |
| 3,587,829 | 6/1971 | Sorensen . | |
| 3,672,113 | 6/1972 | Andra . | |
| 3,755,987 | 9/1973 | Dardaine et al. . | |
| 3,834,120 | 9/1974 | De Faccio et al. . | |
| 3,859,774 | 1/1975 | Bausch . | |
| 3,884,017 | 5/1975 | Butcher ....................... | 53/329 X |
| 3,930,353 | 1/1976 | Beckers . | |
| 3,938,305 | 2/1976 | Jansen et al. . | |
| 4,062,718 | 12/1977 | Hay ............................. | 53/375.3 X |
| 4,139,979 | 2/1979 | Nakazato et al. ........... | 53/329 X |
| 4,276,734 | 7/1981 | de Fasselle et al. ......... | 53/367 X |
| 4,282,699 | 8/1981 | Embro ......................... | 53/367 X |

FOREIGN PATENT DOCUMENTS

| | | |
|---|---|---|
| 458182 | 7/1949 | Canada ..................... 53/367 |
| 57-193603 | 12/1982 | Japan . |
| 59-15008 | 1/1984 | Japan . |
| 59-27499 | 2/1984 | Japan . |
| 59-115221 | 7/1984 | Japan . |
| 61-53306 | 4/1986 | Japan . |

Primary Examiner—John Sipos
Assistant Examiner—Linda B. Johnson
Attorney, Agent, or Firm—Oliff & Berridge

[57] ABSTRACT

The present invention relates to a positioning means and a press-sealing means. The positioning means includes a jig, a base and an elevating apparatus. The jig includes a plate-like element and a placement hole formed therethrough. It holds an upper portion of a container and adjusts the proper position of the container. The base holds a plurality of jigs and rotates by regular angular amounts, varying each jig's position with respect to a container. The elevating apparatus moves the base between a top position, where the jig holds a container and its top surface touches the undersurface of a pair of rails, and a lowest position, where its upper surface is positioned below the undersurface of the container. The base may include a polygonally-cylindrically shaped block, each surface thereof is flat and holds a jig, a framework that secures the block horizontally by a horizontal axis, and a rotating element that rotates the block by regular angular amounts. The press-sealing means includes a base plate, a supporting rod, a pressing unit and balancers. The base plate is moved downward by a cylinder. The supporting rod, securing an universal coupling at the bottom portion, is fixed to the undersurface of the base plate. Balancers are positioned beneath the base plate and it elastically pushes the pressing unit to balance the proper position of the pressing unit.

9 Claims, 9 Drawing Sheets

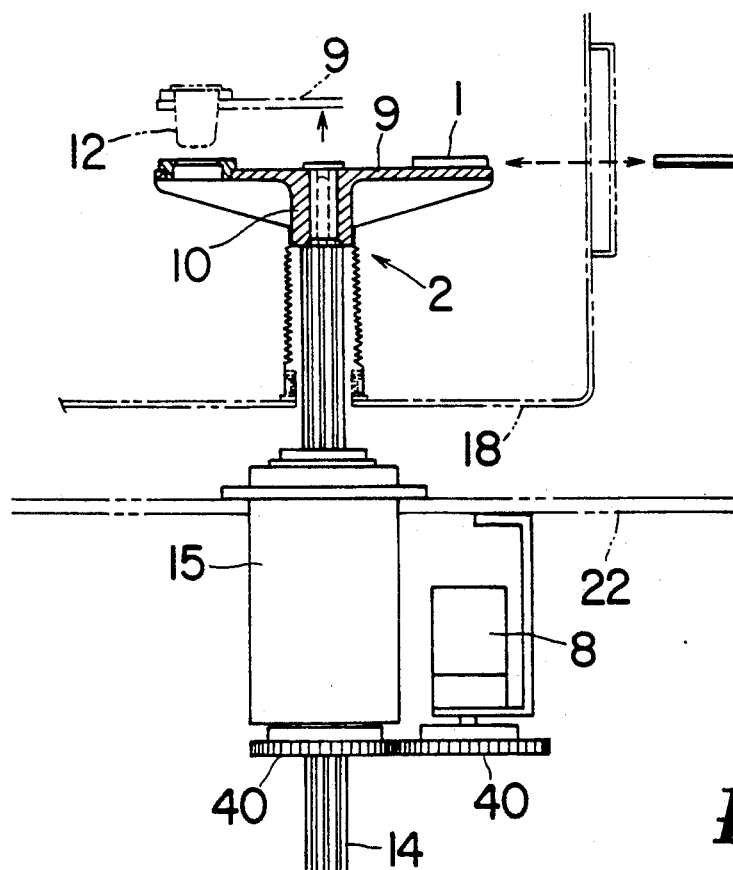
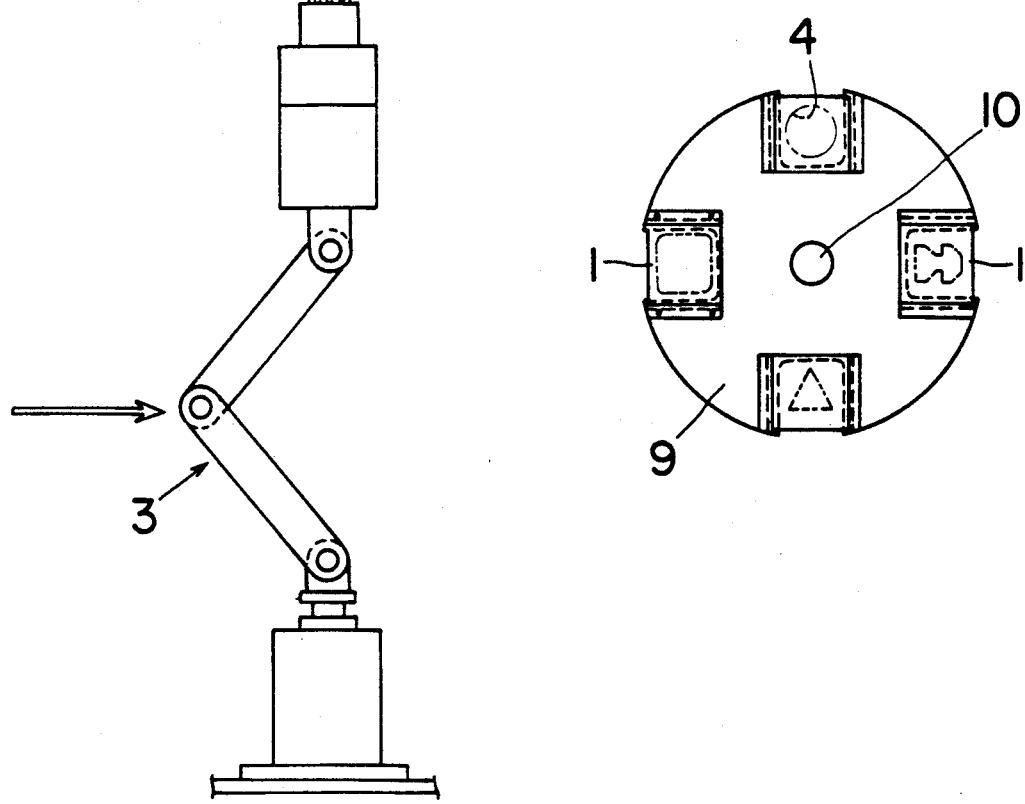
Fig. 3
Fig. 4

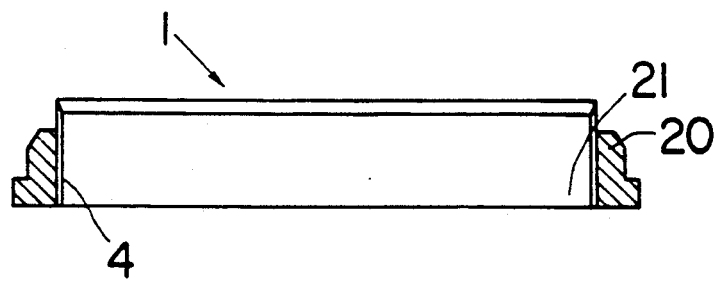
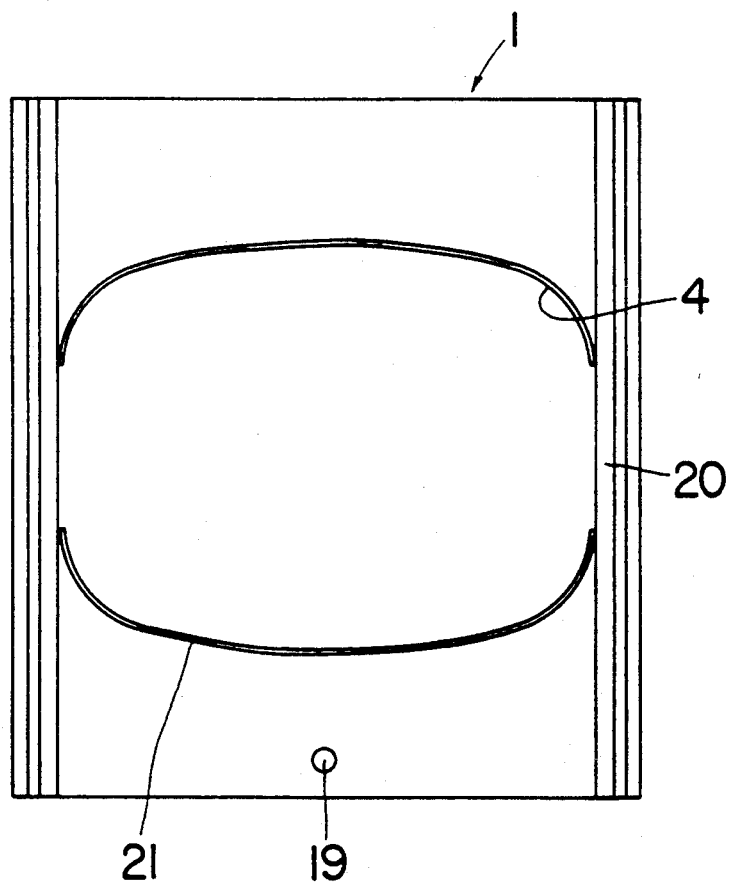

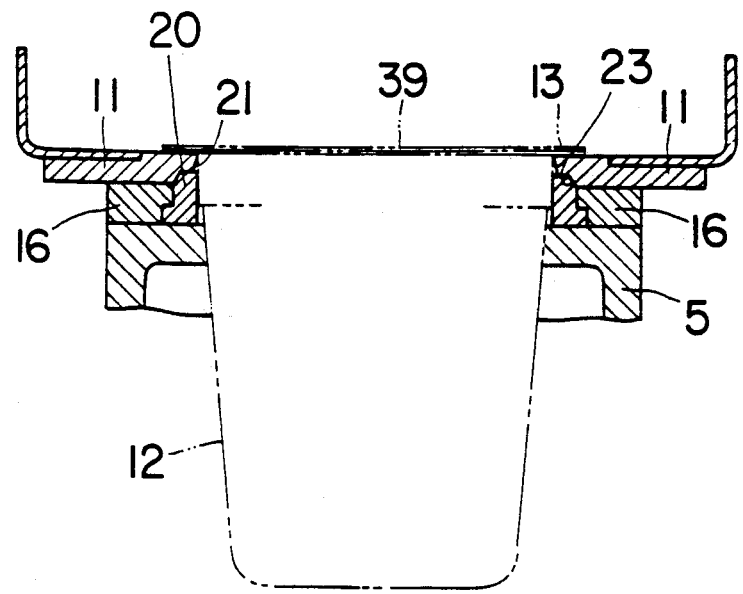
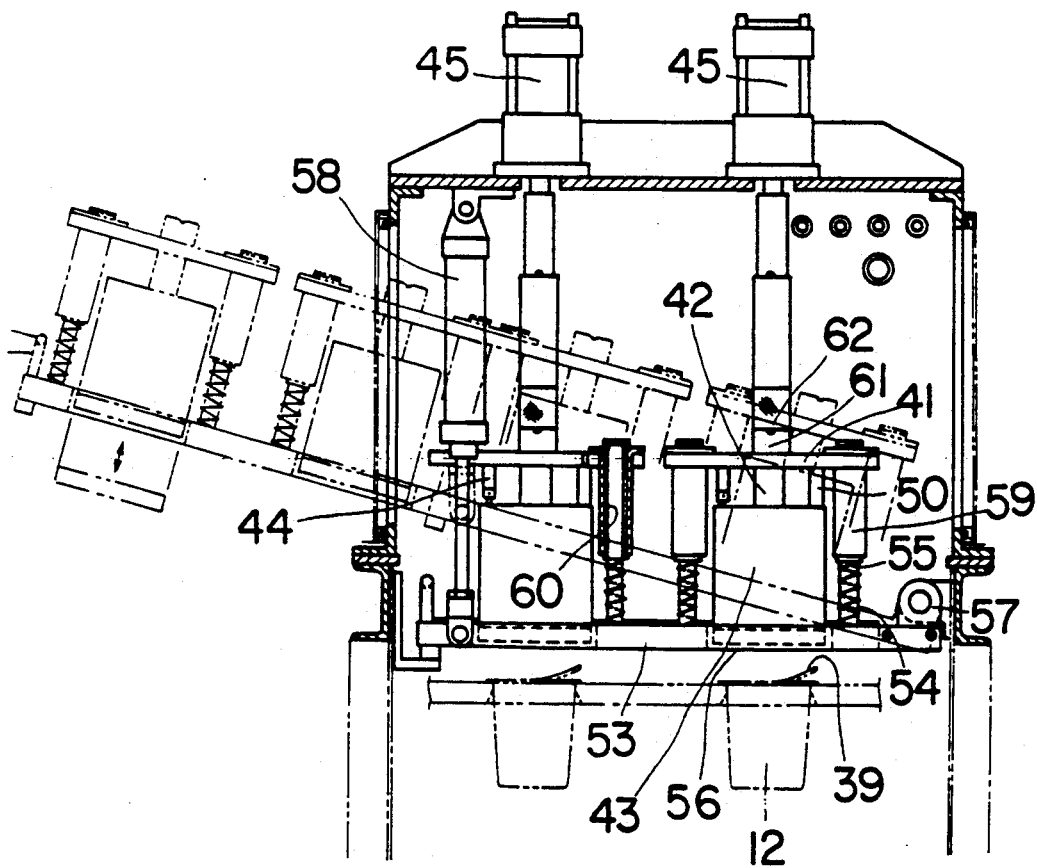

POSITIONING AND PRESS-SEALING MEANS

This is a division of application Ser. No. 07/337,133 filed Apr. 12, 1989.

THE BACKGROUND OF THE INVENTION

The present invention relates to a positioning means and a press-sealing means. They are used, for example, in a fill-and-pack in a non-germ atmosphere machine in which sterilization of containers, filling of food and packing are completed automatically while the containers are carried on a pair of rails. In this machine, the positioning means sets each container's position and supports it from underneath when a lid is pressed and sealed on the container by the press-sealing means.

First, the background of the positioning means will be explained below.

Fresh foods, especially such as dairy products, are preferably filled and packed in a non-germ atmosphere because they rot by germs in a short time. Japanese Utility Model Provisional Publication No. 61-53306 and Japanese Patent Provisional Publication No. 59-115221 introduces machines in which filling and packing dairy foods in a non-germ atmosphere can be done.

In these prior arts, a large number of holder plates are firmly tightened to a conveyer and each of them holds a container in a hole formed therein. The containers are carried as the conveyer moves, and the filling and the packing processes are completed while the position of each container is adjusted by the holder plates.

This type of machine is considerably effective when it is used as such that a same kind of food is filled in certain sized containers for a long time. However, this machine is not effective when it is used for an operation to fill different kinds of foods into different sized containers, each in a short time, such as filling plain yogurt into small containers one week and filling fruit yogurt into bigger containers the next week and so forth. In this machine, when the containers are to be replaced by other sized ones, the holder plates also have to be replaced by others because they cannot hold different sized containers. The holder plates of this machine are tightened to the conveyer by bolts and nuts, so that it takes a lot of time and hard work to replace the holder plates. It is necessary to loosen and then tighten the bolts and nuts for the holder plates. Further, it is also necessary to adjust the position of each holder plate after it is tightened to the conveyer.

Concerning the problems the prior art has, the inventors created a new art that does not comprise holder plates. Instead, it has at least a pair of rails. Containers are hung on the rails by their flanges and are intermittently carried by comb-like teeth that makes a square locus movement.

In this new art, since the containers are hung freely on the rails, adjusting a position of each container and supporting it from underneath are essential when a lid is provided and a hot press sealing thereon is accomplished.

Therefore, the first object of the present invention is to provide a positioning means that sets each container's proper position and gives the container enough strength by supporting it from underneath when a lid is sealed on the container.

Second, the background of the press-sealing means will be explained below.

In a prior art of sealing a seat-like lid on top of a container, a means that heats, presses and seals a lid on top of the container while a flange of the container is supported from underneath is known.

In this kind of means, as shown in FIG. 12, a pressing unit is shakably installed. It is because a thickness of a flange slightly differs depending on a container, some are noticeably deformed. Therefore, in many cases, the undersurface of the pressing unit and the top surface of a container are not parallel. In such a case, a lid could slide on the container since only projected parts of the container is pressed.

Concerning this problem, the prior art shown in FIG. 12 is arranged such that the top center of the pressing unit 43 is pressed by springs 68 while it is supported by hold bars 69, and the presssing unit 43 presses the top surface of a container. In case the top surface of the container is inclined, thus not being parallel to the pressing unit 43, the pressing unit 43 inclines and presses possibly the whole surface of the lid 39.

The problem of the prior art, however, is that a lid on a container could slide from its proper position.

This happens because the top surface of the pressing unit 43 is pushed by a means such as a cylinder. If the pressing unit 43 inclines $\theta$ degrees, a sliding gap (X) of the pressing unit 43 is described as $X = 1 \cdot \sin \theta$. 1 is a distance between the top surface, the point that is pressed by the cylinder, and the undersurface of the pressing unit 43. The sliding gap (X) is proportional to the distance (l).

When a container is sealed by a lid by this prior art, the pressing unit 43 moves down and touches the lid placed on top of the container. As the pressing unit 43 continues to move down, it pushes the lid more downwardly and begins to incline to the same direction the top surface of the container is inclined. The inclination of the pressing unit 43 can be achieved as its undersurface slides in a side direction. By this movement, the lid pushed by the pressing unit 43 will slide with the pressing unit 43 and it will be sealed on the container improperly.

Also, when a so-called ring seal—a ring-like projection and a seal land are provided to the undersurface of the pressing unit and top of a container respectively, and sealing is accomplished by attaching the both—is concerned, the sealing cannot properly be done since the pressing unit slides and the ring-like projection (the pressing surface) slides from the seal land.

The same thing can be said when this prior art is used for a so-called hot-stamp. When the hot-stamp is applied for example on the surface of a box by placing a printing seat thereon, the printing seat could slide since the pressing unit slides and pushes the printing seat in a side direction.

Therefore, another object of the present invention is to present a press-sealing means that will not slide a lid or a printing seat on such as a container or a box, and accomplishes an accurate hot sealing or hot-stamping.

BRIEF DESCRIPTION OF THE DRAWINGS

FIG. 3 is an another preferred embodiment of a positioning means according to the present invention.

FIG. 4 is a top view of the embodiment shown in FIG. 3.

FIG. 5 is a sectional view of a preferred embodiment of a jig of a press-sealing means.

FIG. 6 is a top view of the jig shown in FIG. 5.

FIG. 7 is a sectional view of the jig shown in FIG. 5 and 6, supporting the undersurface of a pair of rails.

FIG. 8 is a preferred embodiment of a press-sealing means according to the present invention.

DETAILED DESCRIPTION OF THE INVENTION

Figure 1:
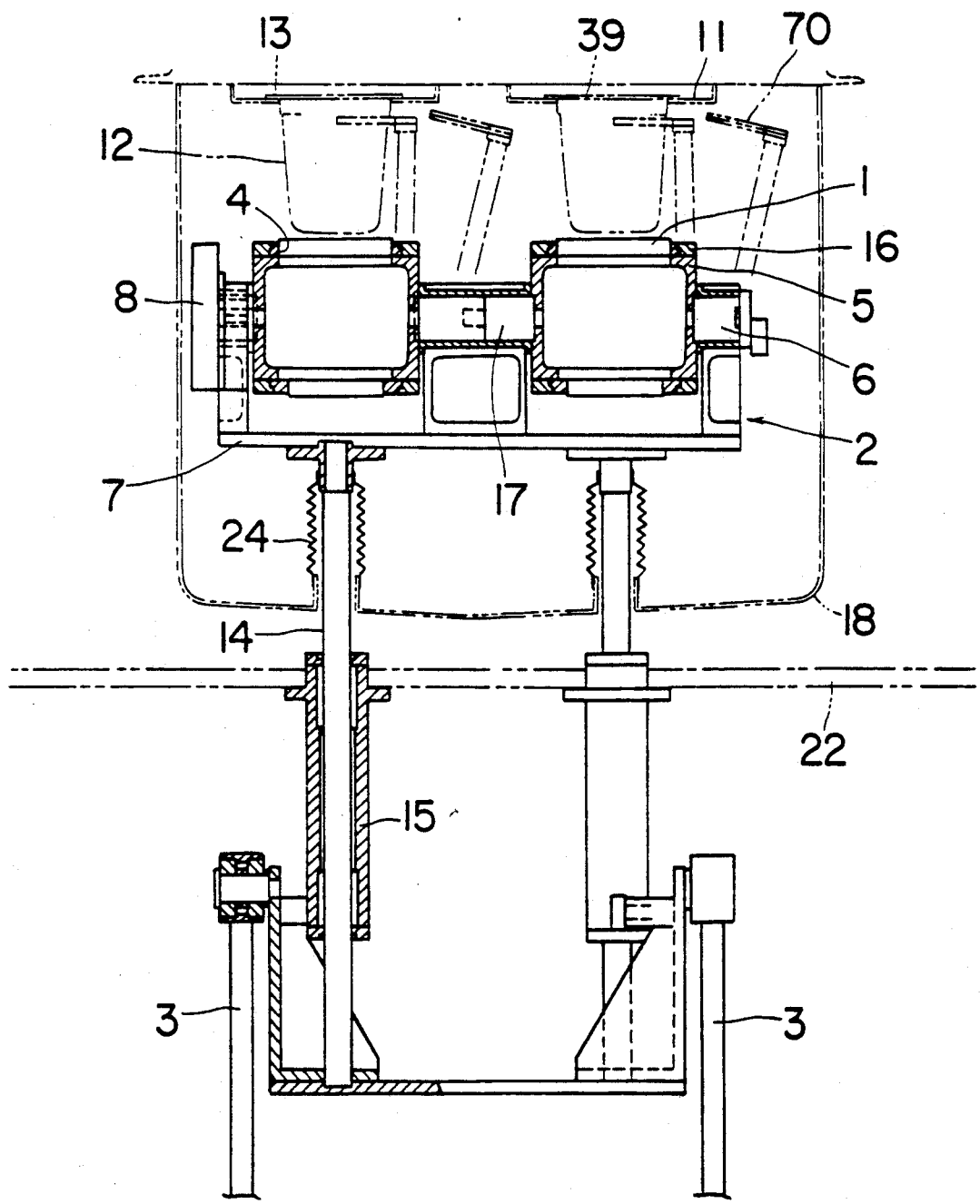
FIG. 1 is an elevational view of a preferred embodiment of a positioning means according to the present invention.

The basic structure and effects of the present invention will be explained below.

First, the positioning means will be explained referring especially FIG. 1. To resolve the problem the prior art has, the positioning means according to the present invention at least comprises a jig 1, a base 2 and an elevating apparatus 3. The jig 1 is made of a plate with a placement hole therethrough which holds a container's upper portion and sets its position. The base 2, securing a number of jigs 1, rotates certain degrees and sets a position of each jig toward a container. The elevating apparatus 3 lifts up and down the base 2. When the base 2 is lifted up to the top position, the top surface of the jig 1 touches the undersurface of a pair of rails, holding a container 12.

When the base 2 is brought down and is at the lowest position, the top surface of the base is below the undersurface of the container 12.

The base 2 comprises a block 5 which is polygonally and cylindrically shaped, each surface therearound is flat and is arranged to hold a jig, a framework 7 that supports the block 5 and keeps its position horizontal by a horizontal axis 6 installed thereto, and a rotating element 8 that rotates the block 7 by certain degrees.

As shown in FIG. 3, the base 2 also can be formed by a plate 9 that holds each jig 1 at a same distance from its center, a vertical axis member 10 projected downwardly from the center of the plate 9, and a rotating element 8 that rotates the plate 9 by certain degrees.

In the positioning means described above, when a container 12 hung on a pair of rails 11 is carried by a comb-like teeth 70 to right above the positioning means, the base 2 placed at the bottom position is lifted up by an elevating apparatus 3, so that the placement hole 4 of the jig 1 secured to the base 2 begins to hold the container 12 therein. See FIGS. 1 to 4. As the base 2 is lifted up higher and is brought to the top position, the placement hole 4 holds the upper portion of the container 12 and sets the container's proper position toward a lid 39. Since the position of the container 12 is properly adjusted, temporal sealing and final sealing of the lid 39 onto the container 12 can be accurately done.

As shown in FIG. 7, when the base 2 comes to the top position, the jig's 1 top surface firmly touches the undersurface of the rails 11, supporting and giving mechanical strength to the rails 11 from underneath against the pressure forced on the container 12 by a pressing unit 43, so that both temporal sealing and final sealing of the lid 39 to the container 12 can accurately be accomplished.

The positioning means can be used not only in a fill-and-pack in a non-germ atmosphere machine described above but in such apparatus that adjust positions of containers for other purposes.

Second, the basic structure and remarkable effects of a press-sealing means according to the present invention will be described below.

To resolve the problem the prior art has, the inventors secured a supporting rod 42, the bottom of which is attached to a universal coupling 46, to the undersurface of the base plate 41, that moves downward by force of a cylinder 45, and connected to the center bottom of the pressing unit 43, that is cubic shaped and has a heat exchange function, to the universal coupling 46. And, they secured a plurality of balancers 44 to the undersurface of the pressing unit 43 to elastically push the pressing unit 43 to keep a proper balance of the pressing unit 43.

Figure 11:
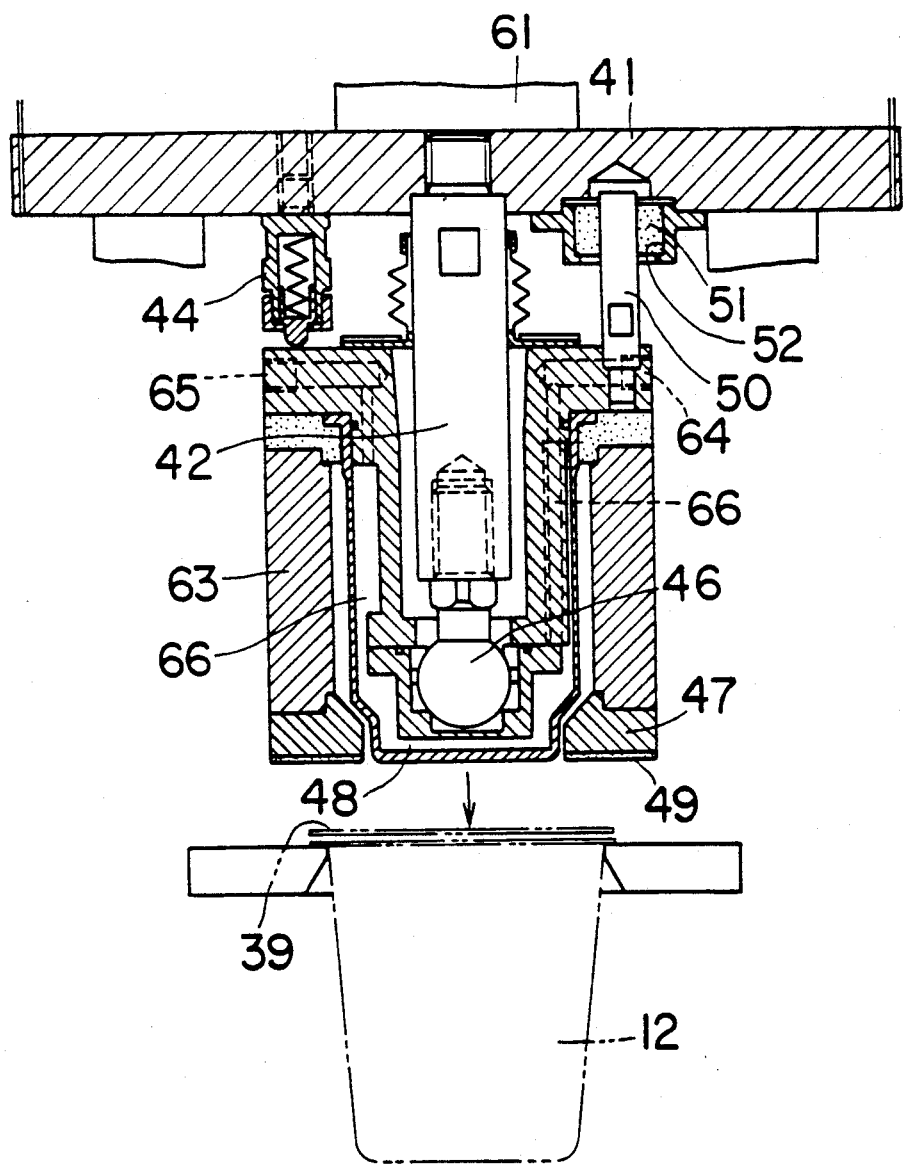
FIG. 11 is a preferred embodiment of the inside structure of a pressing unit according to the present invention.
Figure 12:
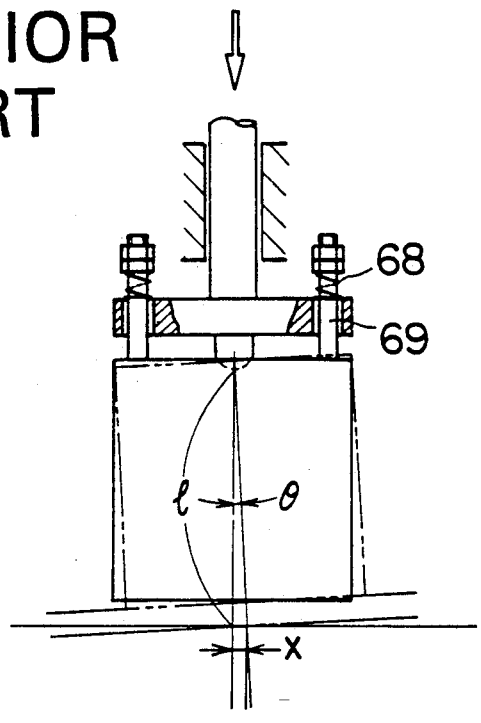
FIG. 12 shows a work of a prior pressing unit.
Figure 13:
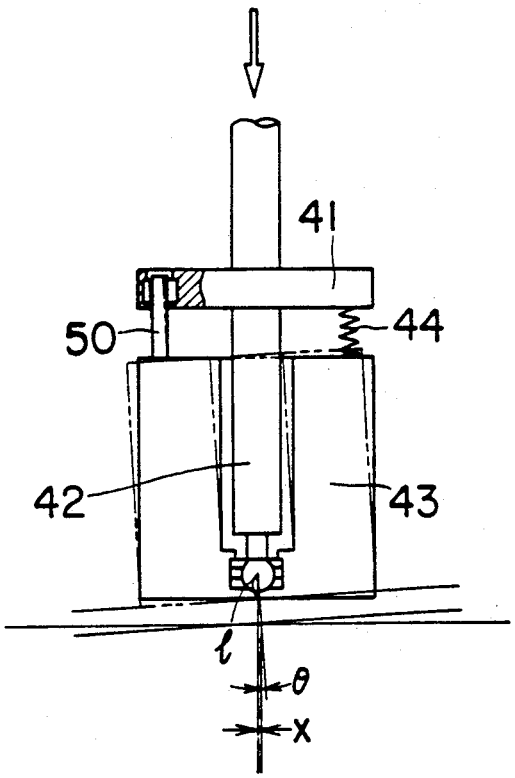
FIG. 13 shows a work of a pressing unit according to the present invention.

In this pressing unit 43, a hot melting means 47, that heats and melts an object for sealing, and a cooling means 48, that cools the object, can be secured inside the pressing unit 43, for example in such a manner as shown in FIG. 11 that the hot melting means 47 is positioned at the outer portion and the cooling means 48 is positioned at the central portion of the pressing unit 43. An elastic plate 49 may also be installed to the undersurface of the pressing unit 43.

Further, the top end of a stopper 50, that prevents the pressing unit 43 from rotating, may be secured to either the base plate 41 or the pressing unit 43 and the other end of the stopper may be secured to a securing hole 52, inside of which is filled with elastic material, attached to either the base plate 41 or the pressing unit 43.

For a practical use of the invention, guide shafts 54, the upper end of which is slidably connected to a hole formed on the edge portion of the base plate 41 and the lower portion of which is fixed to a fixing plate 53 that counter faces the base plate 41, can be secured. And a spring 55 can be installed around each of the guide shafts 54, the top end of which touches the undersurface of the fixing plate 53 and the undersurface of which elastically presses the fixing plate 53. Further, one end of a sliding plate 56, to which the fixing plate 53 is slidably installed, is rotatably fixed by a bearing 57 while the other end is fixed to a cylinder 58.

In the press-sealing means explained above, when the cylinder 45 is not working, the pressing unit 43 is held by the universal coupling 46 secured to the bottom of the supporting rod 42, and the position of the pressing unit 43 is horizontally balanced by the balancers 44, each of which presses the edges of the pressing unit 43 by equal elastic force.

When the base plate 41 is pressed by the cylinder 45, the base plate 41, the supporting rod 42, which is fixed to the undersurface of the base plate 41, and the pressing unit 43, which is held by the supporting rod 42, are forced to move downward, and the undersurface of the pressing unit 43 firmly presses the top portion of an object such as a container.

If the top surface of the container is not parallel to the undersurface of the pressing unit 43 because, for example, a flange 13 of the container 12 is deformed and a thickness of the flange 13 varies from place to place, the undersurface of the pressing unit 43 first touches the highest portion of a lid 39 on the flange 13. As the pressing unit 43 continues to move downward, the undersurface of the pressing unit 43 inclines similar to the inclination of the lid 39. The inclination of the pressing unit 43 is properly accomplished because the pressing unit 43 is shakably held by the universal coupling 43, and the balancers 44 are fixed capable of expansion and contraction allowing the pressing unit 43 to freely incline.

Further, since the pressing unit 43 is held at the center bottom portion and not its top portion by the supporting rod 42, the distance between the work point of the universal coupling 46 and the undersurface of the pressing unit 43, l, is considerably small. Therefore, the sliding gap of the undersurface of the pressing unit 43 is very small as described by a formula of $x = l \cdot \sin \theta$.

It is necessary to note that since the stopper 50 is fixed between the base plate 41 and the pressing unit 43, one end of which being secured in the securing hole 52 formed in the base plate, the pressing unit 43 is prevented from sliding in a circular direction. Further, since the elastic material 51 is installed in the securing hole 52 and the stopper 50 is supported by the elastic material 51, the stopper is allowed to shake slightly, so that the stopper does not restrain the inclination of the pressing unit 43.

As described above, even though the top surface of a container, a flange or a lid is inclined and not parallel to the undersurface of the pressing unit 43, the lid is properly sealed on top of the container.

The preferred embodiments of a positioning means, a press-sealing means, and also a machine in which the positioning means and the press-sealing means are both included unitedly are also described below.

First, a preferred embodiment of the positioning means will be described referring FIGS. 1 and 2.

As shown in this preferred embodiment, both side surfaces of the base 2 are firmly held by a horizontal axis 6. A securing piece 16 is installed to the top surface and the bottom surface of a block 5 of the base 2 which is cubic-like, and a jig 1 is slided in both securing pieces 16, each jig 1 having a different sized placement hole 4. This means is capable of handling two different sized containers.

Another preferred embodiments is as such that each of the four surfaces, except two surfaces that are held by the horizontal axis 6, is arranged to hold a jig 1, so that it is capable of handling four different sized containers. Still another preferred embodiment is as such that a block 5 is formed by a hexagonal or an octagonal box that has six or eight surfaces therearound, and each surface holds a different jig 1, so that it can be employed for six or eight different sized containers.

Figure 2:
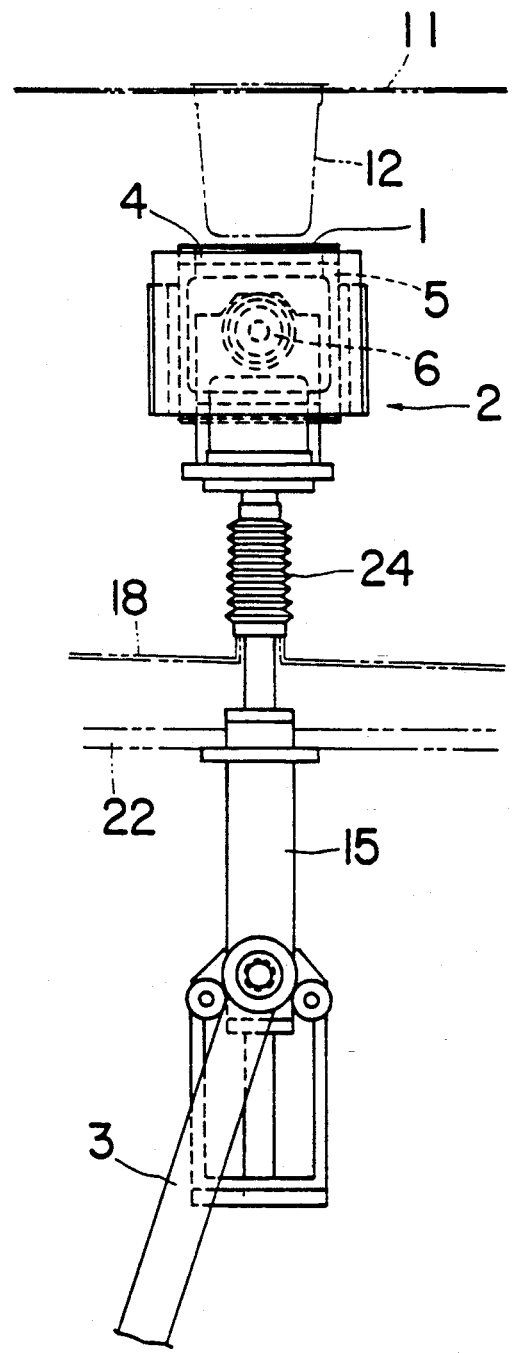
FIG. 2 is a side elevational view of the preferred embodiment shown in FIG. 1.

In the preferred embodiment shown in FIGS. 1 and 2, two blocks 5 are tied in a row by a joint 17, and the horizontal axis 6 is arranged to be rotated by the rotating element 8, a rotary actuator.

Two said blocks 5 are fixed to a framework 7 by the horizontal axis 6, and the framework 7 is connected to a rod 14 that is lifted upward and downward by an elevating apparatus 3. Since the rod 14 is supported and guided by a bearing unit 15 that is secured to a case 22, the movement of the rod 14 is stable.

A bellows, which expands and contracts as the base 2 expands and contracts, is installed between the base 2 and a sealed framework 18, so that any germs in the atmosphere is prevented from leaking in the sealed framework 18.

The type of the elevating apparatus 3 is not limited to the one shown in FIG. 1. For example, other general mechanical methods such as rotating a cam by a motor and transfering the rotary motion to a reciprocating motion by the cam is applicable.

Another preferred embodiment of the positioning means is shown in FIGS. 3 and 4. This shows a type that a vertical axis 10 is secured to the undersurface of a plate 9 that receives jigs 1, and that the plate 9 is rotated by a rotating element 8, a motor. The plate 9 is round and four jigs 1 are installed at the edge portion thereof by a similar distance between them. Each jig 1 can be removed and replaced by another one as shown in FIG. 3.

The rotating element 8 that rotates the plate 9 is positioned beneath the case 22, and the rotation of the rotating element 8 is transferred to the rod 14 by a gear 40. The rod 14 is connected to a vertical axis 10, so that the plate 9 and the jig 1 secured thereto are rotated by regular angular amounts.

Concerning the two above explained embodiments, the block 5 and the plate 9 are automatically rotated by regular angular amounts by the rotating element 8. Therefore, in a fill-and-pack in a non-germ atmosphere machine, a jig 1 can be replaced by another one corresponding to the containers and food can be filled in the containers without opening the sealed framework 18, thus not disrupting the non-germ atmosphere in the machine.

FIGS. 5 and 6 show a preferred embodiment of a jig 1 for the positioning means according to the present invention. The shape of the placement hole 4 is arranged similar to the shape of the upper portion of a container 12, so that the surface of the upper portion of the container 12 is held by the placement hole 4 and the accurate position of the container 12 can be adjusted. However, the method to hold a container 12 by a placement hole 12 is not limited to the one described above. For example, the position of a container 12 can be adjusted by partly holding a container 12 such as holding four corners of the upper portion of the container 12 by the placement hole 4.

A mutual position of a jig 1 and a block 5 is adjusted by means provided to them. In the preferred embodiment described above, a projection 19 is provided to the jig 1 while a concavity is formed on the block 5, and their mutual positions are set as the projection 19 fits the concavity.

FIG. 7 shows a positioning means according to the present invention that is lifted up and touches the undersurface of the rails 11. As shown in this figure, a wall 21 of the jig 1 is positioned between the rails 11 and the container 12, and a supporting portion 20 is fitted in a ditch 23 which is formed the undersurface of the rails 11, and further the top surface of the securing piece 16 is fitted the undersurface of the rails 11, so that accurate positioning of a container 12 is accomplished and the container 12 is firmly supported from underneath when a lid is sealed on the container 12.

Second, a press-sealing means according to the present invention will be described more in detail below referring FIGS. 8 to 11.

As shown in those figures, the preferred embodiment is arranged such that two press-sealing means are secured to a fixing plate 53 in a row so that it seals those two containers 12 at the same time.

The attachment of the fixing plate 53 and the base plate 41 which supports the pressing unit 43 is accomplished by securing a guide shaft 54 on the fixing plate 53, positioning a coil spring 55 around the guide shaft 54, forming holes at both edges of the base plate 41, securing guide pipes 59 in the holes, and inserting the guide shaft 54 in the guide pipe 59 as such that the guide pipe 59 is capable of expansion and contraction and does not fall out from the guide shaft 54. A bush 60 is installed inside of the guide pipe 59 to make the mutual motion of the guide shaft 54 and the guide pipe 59 smooth.

Two balancers 44 are located on the base plate 41, each in a direction diametrically opposed from the center of the base plate 41, and the strength of the elastic force of both balancers 44 are arranged similarly, so that the pressing unit 43 can properly be balanced. Two stoppers 50 are also positioned on the base plate 41, each diametrically opposed direction from the center. Although a preferred embodiment shown in FIG. 11 is arranged such that the stopper 50 is firmly fixed to the pressing unit 43 and the securing hole 52 is formed on the base plate 41 to receive the stopper 50, they may be positioned to the opposite side.

Concerning the preferred embodiment described above, when the cylinder 45 is not exerting force, the guide pipe 59 is brought up to the top position by the elastic force of the coil spring 55, and also the base plate 41, the supporting rod 42, the balancers 44, the stoppers 50 and the pressing unit 43, all of which are connected to the guide pipe 59, are all brought up to the top positions. The position of the pressing unit 43 at this point is kept horizontal by the balancers 44.

When the force of cylinder 45 is exerted the base plate 41, the guide pipe 59, the supporting rod 42, the balancers 44, the stoppers 50 and the pressing unit 43 are all pushed down by the cylinder 45 against the elastic force of the coil spring 55. Then, as described previously, the pressing unit 43 inclines when needed adjusting its horizontal level to that of the top surface of a container 12, and seals a lid 39 on the container 12 by preventing the lid 39 from sliding from top of the container 12.

In this preferred embodiment, the fixing plate 53 is secured to the sliding plate 56 as such that the fixing plate 53 is capable of sliding on the sliding plate 56, so that a separation and an attachment of the press-sealing means can be done easily. One end of the sliding plate 56 is held by a bearing 57 and the other end is held by a cylinder 58, so that it is lifted up and down by the cylinder 58.

To remove the press-sealing means, first, one end of the sliding plate 56 should be lifted up by the cylinder 58. The other end of the sliding plate 56 is held by the bearing 57, so that the sliding plate 56 and the press-sealing means installed thereto are together lifted up in a inclined direction as shown in FIG. 8. After one end of the sliding plate 56 is lifted up high enough to be pulled out from an opening mouth of the sealed framework, a handle 67 fixed thereto is pulled, so that the fixing plate 53 slides on the sliding plate 56 and comes out from the opening mouth and it is then removed from the sliding plate 56.

To place a press-sealing means, a pressing unit 43 can be replaced by another one while the press-sealing means is placed out from the opening mouth, or a set of a fixing plate 53 and a press-sealing means can be replaced by another set. After the press-sealing means is replaced, the fixing plate 53 is slid back on the sliding plate 56, and the sliding plate 56 is pushed back by the cylinder 58 to take a horizontal position as it was. A mutual position of the fixing plate 53 and the sliding plate 56 is fixed by adjusting means provided thereto.

Figure 9:
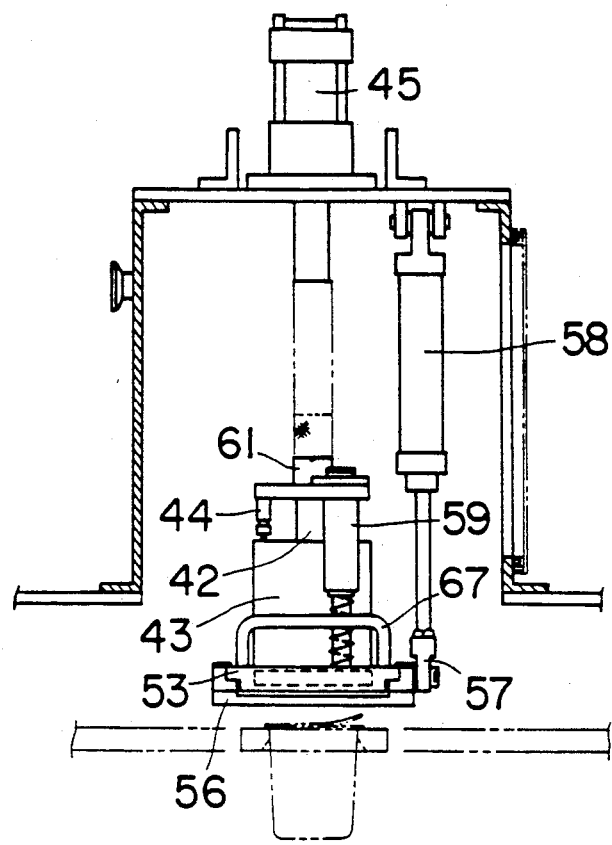
FIG. 9 is a side view of the embodiment shown in FIG. 8.
Figure 10:
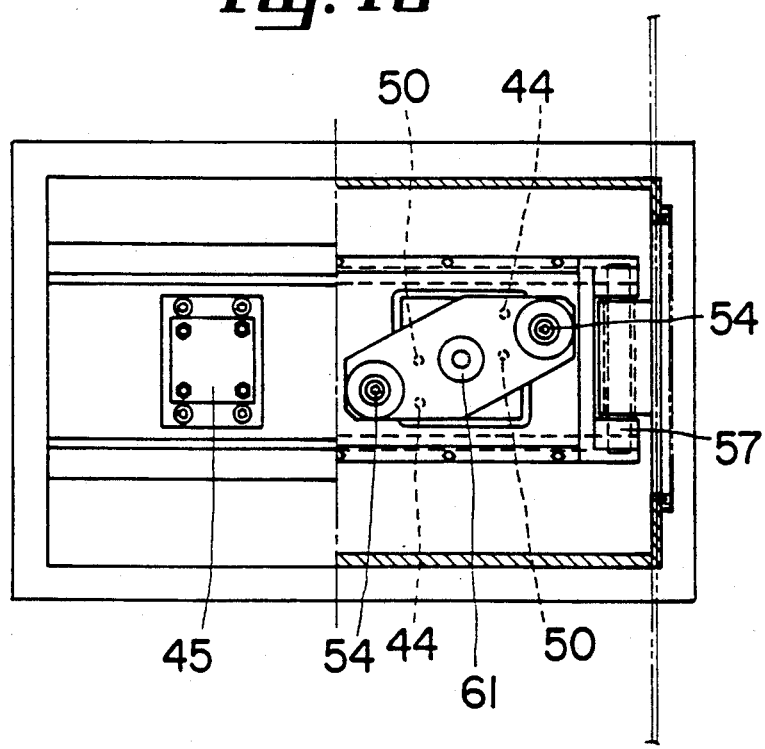
FIG. 10 is a top view of the embodiment shown in FIG. 8 and 9.

As shown in FIGS. 8 and 9, a pressing piece 61, which is capable of being connected and disconnected with a cylinder rod, is placed on the base plate 41, and a projection formed on the undersurface of the cylinder rod is fit in a concave 62 formed on top of the pressing piece 61, so that the cylinder rod and the pressing piece 61 cannot easily be disconnected by an unexpected outside force. The disconnection of the cylinder rod and the pressing piece 61 is accomplished as the cylinder rod contracts.

FIG. 11 shows a preferred embodiment of the inside structure of a pressing unit 43. This embodiment is used for sealing a lid on a container, so that a heater 63 for heating and melting is installed inside a pressing unit 43 and a hot melting means 47, which transfers heat from the heater to a lid, is placed right under the heater 63. An elastic plate 49, such as that made of silicone rubber, is placed undersurface of the hot melting means 47. Since the elastic plate 49 that has elasticity is installed, even though the top surface of a container or a lid is rough, proper sealing can be accomplished.

A cooling means 48 is installed in the middle of the pressing unit 43. At a top end of the pressing unit 43 there is a injection mouth 64 through which cooling water is provided. The cooling water flows through a water passage 66 including the cooling means 48 portion and is exhausted from an exhaust mouth 65.

By structuring so, only a part that is essential for heat sealing is heated while other parts that are not essential for heat sealing and are easy to be damaged by the heat are cooled, so that such damages can be prevented.

The inside structure of the pressing unit 43 is not limited to the structure described above. It can freely be arranged according to a demand. For example, it can be structured as such that the hot melting means 47 or the cooling means 48 is positioned at the bottom front or at the back and so forth.

A machine comprising unitedly a positioning means and press-sealing means according to the present invention is explained below.

Figure 14:
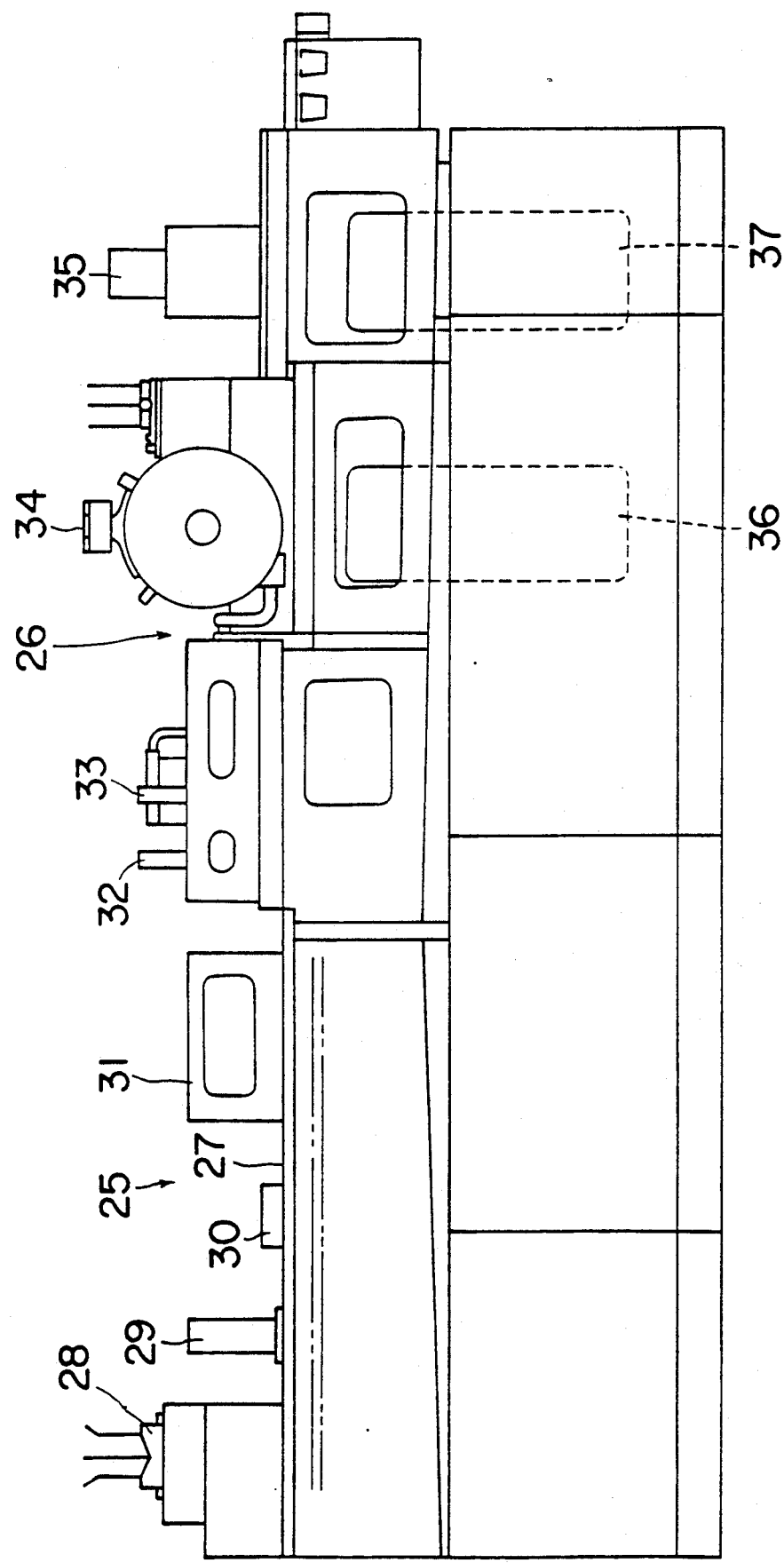
FIG. 14 is an elevational view of a machine for fill-and-pack in a non-germ atmosphere according to the present invention in which a positioning means and a press-sealing means are correlatedly included.

FIG. 14 shows a so-called fill-and-pack in a non-germ atmosphere machine including a positioning means and a press-sealing means according to the present invention. This machine is basically divided into two parts, a container sterilization unit 25 and a fill-and-pack unit 26.

The container sterilization unit 25 comprises a shut framework 27 the inside of which is arranged non-germ, a container supplier 28 that provides containers, a sterilizer dispatching mouth 29, an ultraviolet rays apply mouth 30, a hot wind blow duct 31 and a hot wind sucking duct 32. In the shut framework 27, at least a pair of rails is provided, and containers provided from the container supplier 28 are hung by the rails. Each container hung by the rails then is pushed intermittently by a plate that is secured to a chain positioned right under the rails.

The container carried on the rails is sterilized first by sterilization agent applied from the sterilizer dispatching mouth 29 and then by ultraviolet rays applied from the ultraviolet rays apply means 30, and it is completely dried by heat wind and is carried to the fill-and-pack unit 26.

The fill-and-pack unit 26 is formed by positioning a filling means 33, a lid sterilization means 34, a first positioning means 36, a second positioning means 37, a press-sealing means 35, rails 11 and a comb-like teeth means in a sealed framework.

A container provided from the container sterilization unit 25 is hung by a pair of rails 11 and is carried beneath the filling means 33 by the comb-like teeth, that makes a square motion at horizontal level, where the container is filled with food. The container with the food then is carried beneath the lid sterilization means 34 by the comb-like teeth where the position of the container is adjusted by the first positioning means 36, and a lid 39 is provided on top of the container, sealing the container temporarily. The container on which the lid is temporarily sealed is then carried beneath the press-sealing means 35 where the position of the container is adjusted and a flange 13 of which is supported by the second positioning means 37, and the container is sealed with the lid 39 by the press-sealing means 35.

After the sealing is completed, the container is pushed by a container behind and is carried out from the sealed framework, finishing the whole process of this machine.

The press-sealing means according to the present invention is not only used in the fill-and-pack in a non-germ atmosphere machine but it is also used in fields, such as a hot stamping and a pressing, in which adjusting a pressing surface of a means corresponding to an inclination of an object is significantly important.

The remarkable effects of the positioning means and the press-sealing means according to the present invention are as follows.

First, the effects of the positioning means are summarized hereinafter. Since the positioning means is composed of a jig 1, a base 2 and an elevating apparatus 3, positioning and supporting a container, which is held freely by a pair of rails, from underneath, when a lid is provided on the container and when a lid is pressed for sealing, can properly be accomplished.

Since a plurality of jigs 1 can be attached to the base 2 and the base 2 is capable of rotating by regular angular amounts, although containers are to be replaced by different sized ones, a jig 1 that fits the new containers can be prepared merely by rotating the base 2, so that, not like the prior art, replacing holder plates to change the jig is unnecessary. Therefore, a lot of time and work can be saved and productivity is increased. This positioning means is considerably effective when it is applied for use that many kind of foods should be filled in a short time, each food in different sized container. Since the base 2 is rotated by a rotating element 8 without disrupting a non-germ atmosphere, recreating a non-germ atmosphere which is needed in the prior art when containers are replaced by different sized ones is unnecessary, so that productivity is increased and the positioning machine is again especially advantageous in such use that each different kind of foods should be filled in a different sized container in a short time.

The remarkable effects of the press-sealing means are as follows.

Since the center bottom of the pressing unit 43 is held by a universal coupling 46 secured to the bottom end of the supporting rod 42, when the top surface of an object such as a container is inclined, the pressing unit 43 easily inclines corresponding to the object's inclination. Further, since the distance between the work fulcrum of the universal coupling 46 and the undersurface of the pressing unit 43 is small, the sliding gap of the undersurface of the pressing unit 43 is minimized.

Since the balancers 44 are installed to the undersurface of the base plate 41, the end thereof elastically forcing the top surface of the pressing unit 43, the position of the pressing unit 43 is properly balanced, and the pressing unit 43 can easily be inclined corresponding to the inclination of an object such as a container agaist the elastic force of the balancers 44.

Since the stoppers 50 are secured in the securing holes 52, the pressing unit 43 is prevented from rotating in a circular direction and from sliding a lid 39 in the same direction thus sealing it improperly. The stoppers 50 are supported by the elastic material 51 installed in the securing holes 52, so that the pressing unit 43 is allowed to incline agaist the elastic force of the elastic material 51.

As a result, even though the top surface of an object such as a container and a lid is inclined, a lid is prevented from being sealed improperly like the prior art, and a process of the press-sealing can accurately be accomplished.

By operating the positioning means and the press-sealing means unitedly—pressing and sealing a lid on a container by the press-sealing means while adjusting the proper position of the container and supporting it from underneath by the positioning means—a lid can always properly be sealed on the container.

What we claim is:

1. A press-sealing means for sealing an object comprising:
    a base plate having an undersurface, a cylinder for selectively pushing said base plate downward,
    a supporting rod having a first end and a second end, said first end being connected to said undersurface of said base plate for downward movement therewith, and said second end being connected to a universal coupling said universal coupling being located at said second end,
    a pressing unit positioned beneath said base plate for downward movement therewith, said pressing unit comprising a bottom portion with a sealing surface and a heat exchange means, said universal coupling coupled to said pressing unit at a center of said bottom portion,
    a balancer means for balancing said pressing unit, said balancer means secured to said undersurface of said base plate and said balancer elastically pressing against said pressing unit for allowing said pressing unit to incline upon engagement with the object to be sealed.

2. A press-sealing means as claimed in claim 1, further comprising a hot melting means installed in said pressing unit, said hot melting means being capable of heating and melting an object for sealing.

3. A press-sealing means as claimed in claim 1, wherein an elastic plate is attached to, a pressing surface of said pressing unit.

4. A press-sealing means as claimed in claim 1, further comprising a stopper, one end of which is fixed to one of said pressing unit and said base plate and the other end of said stopper is held by an elastic material in a securing hole formed in the other of said pressing unit and said base plate.

5. A press-sealing means as claimed in claim 1, further comprising a guide shaft having a top portion, said top portion being installed movably in a hole formed at an edge portion of said base plate and the bottom portion of said guide shaft is fixed to a fixing plate which is beneath said base plate, and a spring is provided around said guide shaft, a top face of said spring pressing elastically the undersurface of said base plate, a bottom face of said spring pressing elastically said fixing plate.

6. A press-sealing means as claimed in claim 1, further comprising a sliding plate having a first end and a second end, a fixing plate, a bearing and a cylinder means for selectively lifting said second end of said sliding plate, said fixing plate being slidably secured to said sliding plate, said first end of said sliding plate being held rotatably by said bearing, said second end of said sliding plate being connected to said cylinder means.

7. A press-sealing means as claimed in claim 1, positioned over a positioning means, said press-sealing means being capable of sealing a lid on a container after said container is positioned and supported from underneath by said positioning means.

8. A press-sealing means as claimed in claim 1, further comprising a cooling means installed in said pressing unit.

9. A press-sealing means as claimed in claim 2, further comprising a cooling means installed in said pressing unit.

* * * * *